Aug. 5, 1924.  1,503,666
F. T. ROBERTS
MOLD FOR MAKING HOLLOW ARTICLES OF PLASTIC MATERIAL
Filed July 9, 1921
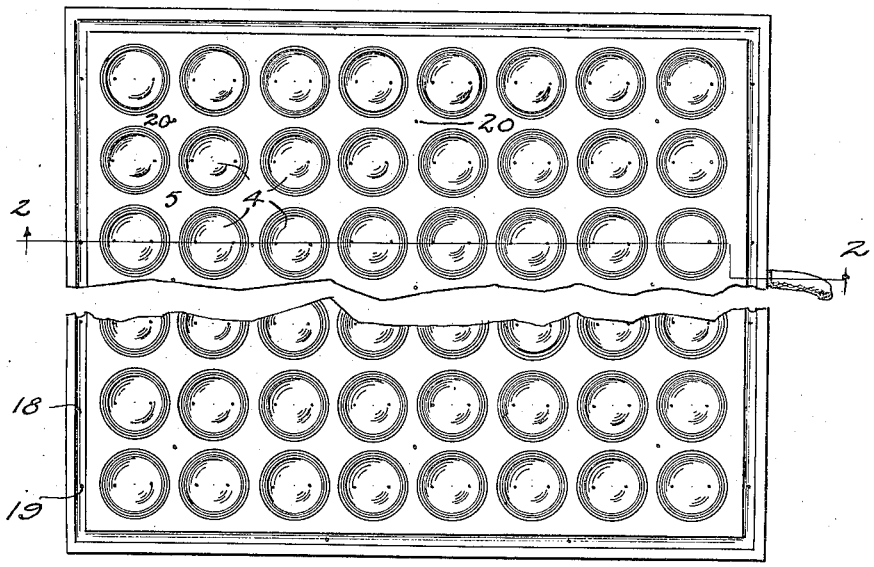
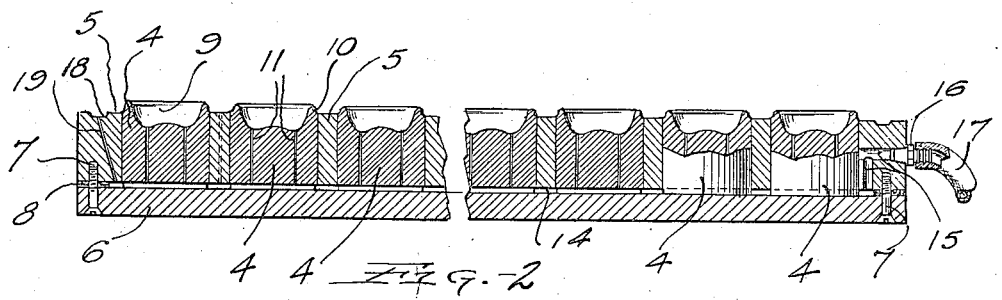
INVENTOR
Fred Thomas Roberts,
BY Baker & Macklin,
ATTORNEYS Patented Aug. 5, 1924.

1,503,666

UNITED STATES PATENT OFFICE.

FRED THOMAS ROBERTS, OF PHILADELPHIA, PENNSYLVANIA.

MOLD FOR MAKING HOLLOW ARTICLES OF PLASTIC MATERIAL.

Application filed July 9, 1921. Serial No. 483,404.

*To all whom it may concern:*

Be it known that I, FRED THOMAS ROBERTS, a citizen of the United States, residing at Philadelphia, in the county of Philadelphia and State of Pennsylvania, have invented a certain new and useful Improvement in Molds for Making Hollow Articles of Plastic Material, of which the following is a full, clear, and exact description, reference being had to the accompanying drawings.

This invention relates to the manufacture of hollow rubber articles and is directed to the improvements in the construction of pneumatic forming molds of the general type described and illustrated in Letters Patent No. 1,346,848, issued to me July 20, 1920, for a method of making hollow rubber articles.

In my process of manufacturing comparatively small hollow rubber articles I have found that great economy may be obtained by molding a plurality of articles in one operation. In order to do so, it is necessary to provide upper and lower mold members each having a number of mold cavities formed therein, each in communication with a suction conduit. It is quite essential moreover that all the cutting edges in each mold terminate accurately in the same plane, and that the perimeters of the mold cavities in the upper and lower mold members be accurately superposed. Such forming mold has a raised annular cutting edge surrounding a cavity and suitable passageways are provided to enable suction to exhaust the air from the cavity and consequently causes a collapse into the mold cavity of the material from which the articles are being molded.

The general object of this invention therefore is the provision of a mold member wherein accuracy and economy of construction may be attained by arranging a plurality of blocks having uniform cavities formed in one end thereof in a mold holder, in proper spaced relation.

In the drawings, Fig. 1 represents a plan view of a mold holder, while Fig. 2 is a cross sectional elevation substantially along the line 2—2 of Fig. 1; Fig. 3 is an enlarged cross section of parts of the mold holder and two of the mold members.

In constructing molds for the manufacture of hollow rubber articles where a number of the articles are molded simultaneously, considerable difficulty has been experienced in obtaining uniformity when machining the mold cavities. To form them in the surface of a solid metallic block is an operation both cumbersome and expensive. The formation of accurate raised edges, which serve as severing or parting means for shearing the molded material around the perimeters of the mold cavities, also requires considerable skill and time.

To eliminate these expensive operations, I have provided individual mold blocks 4 having the cavities and cutting edges and I mount these in a mold holder 5, which is provided with a back reinforcing plate 6. This back plate may be secured to the mold holder by any suitable means, such as screws 7 positioned around the outer edge of the mold member. A marginal gasket 8 between the holder and plate insures an air tight connection, while by recessing the lower face of the holder I provide a suction chamber, as hereinafter described, and I eliminate the necessity of finishing more of the lower face of the holder than the marginal portion.

In making the holder the faces may first be finished, after which they may be temporarily clamped or bolted together, after which spaced openings, corresponding to the diameter of the individual mold members 4 may then be bored in both the upper and lower mold holders in one operation, thus insuring perfect alignment of these bored holes.

The cavities 9 in the mold members 4 are particularly adapted to the molding of hollow spherical objects and may be formed in the end of the mold members by a simple turning operation with a forming tool, the cutting edges of which may correspond to the contour of the cavity to be formed. A similar tool may be used for forming the severing edges surrounding the perimeters of the mold cavities. The proper depth of the cavity in such an operation is readily obtained.

The diameter of the mold members may be only slightly less than the diameter of the bored openings in the mold holder so that the individual mold member may snugly fit these openings with their lower ends seating firmly on the back plate 6.

It is important that the shearing edges 10 of the mold block be in a common plane when the molds are assembled in the holder. Hence, a distinct advantage is obtained by having the supporting plate 6 removably secured to the mold holder as any variation in the height of these mold members may be corrected by removing the plate, after which the inaccurate block may be removed from the mold holder and sufficient metal be removed from the bottom thereof if it is too high, or if the mold block is too short, strips of paper may be pasted to the end of the block to raise it to the proper height. Sufficient rust soon forms on the cylindrical surfaces of the blocks to give them a tight fit in the holder.

Suitable vents 11 may be formed in each mold block to provide communication between the mold cavity formed in the outer end thereof and a transverse slot 12 formed in the bottom surface of the mold member. This slot may have a depth corresponding to the thickness of the gasket 8 interposed between the bottom surface of the mold holder 5 and the inner surface of the supporting plate 6.

The gasket member 8 thus serves as a spacing member to provide a suction chamber 14 between the mold holder and the plate as well as a seal therefor. Suitable openings 15 communicating with a coupling member 16 secured to the side of the mold holder may provide communication between the exhaust chamber 14 and an exhaust tube 17 connected to suction means, not shown. I thus obtain a very simple and economical arrangement of the exhaust vents and connections with the suction machine.

An annular groove 18 formed in the upper face of the mold holder may have suitable vent openings 19 communicating with the exhaust chamber 14 so that when a sheet of material is placed over the surface of the mold, the edges thereof may be drawn into the grooves 18. A seal between the under surface of the sheet and the upper surface of the mold holder may thus be obtained. Similar vents 20, extending from the upper surface of the mold holder to the exhaust chamber, serve as outlets for exhausting the space between the upper surface of the mold holder and the sheet of material to be molded.

Having thus described my invention, I claim:

1. A mold of the class described, comprised substantially of a mold holder having a base plate and a series of individual cylindrical mold members having mold cavities in one end thereof and having projecting edges surrounding the cavities, said members being seated in cylindrical openings in the mold holder and having their extreme ends opposite the cavitary ends engaging the base plate, whereby adjustment of the individual members may be made to position said edges at a common height from the base of the mold holder.

2. A mold of the class described comprised substantially of a mold holder provided with an exhaust chamber and a plurality of separately formed mold members carried by the holder having mold cavities formed therein, and having communicating passageways between said cavities and the exhaust chamber in the holder, whereby the air in said cavities may be exhausted.

3. A mold of the class described comprised substantially of a mold holder provided with an exhaust chamber, and a plurality of individual separately formed mold members mounted in the mold holder and having cavities, said mold holder having an annular groove formed in the upper surface thereof and passageways providing communication between the groove and the exhaust chamber, whereby the ends of a sheet of material placed over the mold members may be drawn into the groove when air is exhausted from said exhaust chamber.

4. A mold of the class described comprised substantially of a mold holder and a series of individual separately formed members mounted in the holder and having projecting edges surrounding mold cavities formed therein, there being communicating passageways between said cavities and an exhaust chamber in the holder, whereby the air in said cavities may be exhausted.

5. A mold of the class described comprised substantially of a mold holder provided with an exhaust chamber, and a plurality of mold members mounted in the mold holder and having each a mold cavity in its end and a raised severing edge surrounding the cavity, said mold holder having an annular groove formed in the upper surface thereof, and passageways providing communication between the groove and the exhaust chamber, whereby the ends of a sheet of material placed over the severing edges of the mold members may be drawn into the groove when air is exhausted from said exhaust chamber.

6. In a mold of the class described, the combination of a mold holder having a plurality of openings formed therein, a supporting plate secured to the underside of the mold holder, the walls of said openings extending at right angles to the supporting plate, and a plurality of cavitary mold members having their side surfaces extending continuously at right angles to said supporting plate and positioned in said mold holder openings and having the ends opposite the cavity resting on said supporting plate.

7. In a mold of the class described, the combination of a mold holder having a plurality of uniform openings formed therein, a supporting plate secured to the underside of the mold holder, a gasket interposed therebetween, and a plurality of mold members positioned in said mold holder openings and adapted to rest on said supporting plate.

8. A mold of the class described comprised substantially of a mold holder having a plurality of openings formed therein, a supporting plate secured to the under surface of the mold holder, a gasket interposed between the mold holder and supporting plate, and a plurality of molding blocks having cavities formed in the upper ends thereof positioned in the openings of said mold holder, said mold blocks having vent openings extending from said upper mold cavities downwardly and adapted to communicate with the space between the mold holder and the supporting plate.

9. A mold of the class described comprised substantially of a mold holder having a plurality of openings formed therein, a supporting plate secured to the under surface of the mold holder, a gasket interposed between the mold holder and supporting plate, and a plurality of molding blocks having cavities formed in the upper ends thereof positioned in the openings of said mold holder, said mold blocks having vent openings extending from said upper mold cavities downwardly and terminating in grooves formed in the under surface of the mold blocks, whereby communication is established between the mold cavities and the space between the mold holder and the supporting plate.

10. In a mold of the class described, the combination of a mold holder having an exhaust chamber formed therein, and a plurality of separately formed mold members supported by the mold holder in such a manner that the upper ends of the mold members may project a uniform distance from the upper surface of the mold holder, and the lower ends of the mold members may project a uniform distance into said exhaust chamber whereby a passageway extending through the mold members may provide communication from mold cavities formed in the upper ends of the mold members to said exhaust chamber.

11. In a mold of the class described, the combination of a mold holder and a plurality of mold members engaged in the mold cavities formed in the upper ends thereof, the mold members having projecting edges of uniform height surrounding the cavities, and the mold member being provided with passageways extending from the spaces intermediate said projecting edges and said exhaust chamber whereby a sheet of material placed upon said projecting edges may be drawn into contact with the upper surface of the mold holder.

12. In a mold of the class described, the combination of a mold holder comprising a member having cylindrical recesses and a base member extending continuously across the bottoms of the various recesses, and a plurality of cylindrical mold members occupying the recesses and supported on the base of the holder, said mold members having projecting edges surrounding mold cavities formed in the upper surfaces thereof, and being adjustable in the mold holder whereby said edges may be positioned at a uniform level.

13. A mold block comprising a body having a cupped end surrounded by a projecting edge, a groove in the end of the mold block opposite the cutting edges, and a passageway affording communication between the groove and the cavity.

14. In a mold block, a cylindrical body portion having a cavity in its upper end and having a circumferential peripheral cutting portion adjacent the cavity, a groove in the end of said mold block opposite said cavity, and a passageway leading from said groove to the mold cavity.

15. In a mold of the class described, the combination of a mold holder having means thereon for receiving and positioning mold members, separately formed mold members arranged in the mold holder, said mold members having grooves therein whereby the holder serves to support the molds and to provide a vacuum chamber.

16. In a mold of the class described, a mold holder having a plurality of partition portions defining a plurality of independent compartments, mold members arranged in said compartments, and communicating passageways in the mold members and across the partition portions.

17. The combination, with a holder having a set of cylindrical holes therein, of mold blocks in the respective holes, each comprising a cylindrical body portion snugly engaging the surrounding portion of the holder and having a cavity in its upper end and having a circumferential peripheral cutting portion adjacent the cavity, a groove in the other end of said mold block opposite said cavity, and a passageway leading from said groove to the mold cavity, the holder having a bottom plate which the bottoms of said blocks abut.

18. The combination of a mold holder having a plurality of spaced compartments, cavitary mold members arranged in said compartments, and passageways across the space between the compartments arranged to communicate with the cavities in the mold members in the compartments.

19. The combination of a mold holder having a plurality of spaced compartments, mold blocks arranged in said compartments and each having a cavity surrounded by an annular cutting edge, passageways across the space between the compartments arranged to communicate with the cavities in the mold blocks in the compartments, and a base plate engaging and supporting said mold blocks.

20. A mold holder having a plurality of openings through it, a plurality of mold blocks occupying the openings and each having a recess in one end, a supporting plate extending across the bottom of the mold member and blocks, passageways leading from the cavities of the different blocks, and means associated with the holder for enabling the passageways of the different blocks to communicate with each other.

21. A mold holder having a plurality of openings through it, a plurality of mold blocks occupying the openings and each having a recess in one end surrounded by an annular cutting edge, and a supporting plate extending across the bottom of the mold member and engaging the blocks, there being passageways leading from the cavities of the different blocks through the blocks and terminating in grooves adjacent the supporting plate and there being space between the supporting plate and the partitioning portions of the holder for enabling the passageways of the different blocks to communicate with a common chamber.

In testimony whereof, I hereunto affix my signature.

FRED THOMAS ROBERTS.